(12) United States Patent
Nakashima

(10) Patent No.: US 11,391,907 B2
(45) Date of Patent: Jul. 19, 2022

(54) IMAGE PICKUP APPARATUS EQUIPPED WITH ROTATABLE OPERATING RING

(71) Applicant: CANON KABUSHIKI KAISHA, Tokyo (JP)

(72) Inventor: Shinga Nakashima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 256 days.

(21) Appl. No.: 16/566,596

(22) Filed: Sep. 10, 2019

(65) Prior Publication Data
US 2020/0096724 A1 Mar. 26, 2020

(30) Foreign Application Priority Data
Sep. 21, 2018 (JP) .............. JP2018-177490

(51) Int. Cl.
*G02B 7/02* (2021.01)
*G03B 17/12* (2021.01)

(52) U.S. Cl.
CPC ............. *G02B 7/026* (2013.01); *G03B 17/12* (2013.01)

(58) Field of Classification Search
CPC .................. G02B 7/026; G03B 17/12
See application file for complete search history.

(56) References Cited

U.S. PATENT DOCUMENTS

2007/0242940 A1* 10/2007 Yumiki ............... G03B 3/02
396/79

2011/0013902 A1* 1/2011 Kim .................. G03B 17/566
396/530
2020/0026024 A1* 1/2020 Asano ................. G02B 7/08
2020/0257073 A1* 8/2020 Takezawa .......... G03B 17/12

FOREIGN PATENT DOCUMENTS

| JP | 2011-008970 A | 1/2011 |
| JP | 2013-114075 A | 6/2013 |
| JP | 2017-072474 A | 4/2017 |

OTHER PUBLICATIONS

The above foreign patent document was cited in the May 10, 2022 Japanese Office Action, a copy of which is enclosed with an English Translation, that issued in Japanese Patent Application No. 2018-177490.

* cited by examiner

*Primary Examiner* — Clayton E. LaBalle
*Assistant Examiner* — Diana Hancock
(74) *Attorney, Agent, or Firm* — Cowan, Liebowitz & Latman, P.C.

(57) ABSTRACT

An image pickup apparatus includes a rotary ring that has a plurality of groove portions formed in an inner periphery in a rotation direction, a holding member that holds the rotary ring, a click member that generates a click feel by repeating an abutting state in which the rotary ring abuts on the groove portion and a non-abutting state in which the rotary ring does not abut on the groove portion when the rotary ring is rotated, and an urging member that urges the click member from an inside of the rotary ring toward an outside of the rotary ring. The click member which protrudes from a cutout portion obtained by cutting out a portion of the holding member abuts on the groove portion from the inside of the rotation ring toward the outside of the rotation ring.

2 Claims, 9 Drawing Sheets

IMAGE PICKUP APPARATUS EQUIPPED WITH ROTATABLE OPERATING RING

BACKGROUND OF THE INVENTION

Field of the Invention

The present invention relates to an image pickup apparatus, and in particular to an image pickup apparatus equipped with a rotatable operating ring.

Description of the Related Art

In general, some image pickup apparatuses such as digital cameras or video cameras are equipped with a rotatable operating ring provided on an outer periphery of a lens barrel so as to adjust settings relating to shooting conditions such as focus, aperture, and zoom. Among operating rings, there is an operating ring having a mechanism of generating a click feel in order to enable recognition of an operator performing a rotating operation.

For example, there is an operating ring in which an annular ring is engaged with the operating ring, and thus the annular ring is rotated in synchronization with the rotation of the operating ring (see Japanese Laid-Open Patent Publication (kokai) No. 2011-8970). In Japanese Laid-Open Patent Publication (kokai) No. 2011-8970, a comb-shaped groove portion for generating a click feel is formed in the annular ring, a ball and a spring are held in a fixing member, and the ball is pressed on the groove portion of the annular ring. Thus, when the operator rotates the operating ring, the click feel is generated by the ball moving along the groove portion of the annular ring that rotates along with the operating ring.

However, in the Japanese Laid-Open Patent Publication (kokai) No. 2011-8970, it is necessary that at least the annular ring is formed over the entire periphery of the lens barrel, in order to obtain the click feel even when the operating ring is rotated 360°. Therefore, this results in the lens barrel inevitably being upsized due to difficulty of disposing other component and the like at a position at which the annular ring is to be disposed.

SUMMARY OF THE INVENTION

The present invention provides an image pickup apparatus which easily provides a click feel at time of a rotating operating, with avoiding an increase in size and saving a space.

Accordingly, the present invention provides an image pickup apparatus including a rotary ring configured to be provided at an outer periphery of a lens barrel and have a plurality of groove portions formed in an inner periphery in a rotation direction, a holding member configured to hold the lens barrel and to be provided at the inner periphery of the rotary ring to hold the rotary ring, a click member configured to generate a click feel by repeating an abutting state in which the rotary ring abuts on the groove portion and a non-abutting state in which the rotary ring does not abut on the groove portion when the rotary ring is rotated, and an urging member configured to be held at an inner periphery of the holding member and to urge the click member from an inside of the rotary ring toward an outside of the rotary ring, wherein the click member which protrudes from a cutout portion obtained by cutting out a portion of the holding member abuts on the groove portion from the inside of the rotation ring toward the outside of the rotation ring.

According to the present invention, it enables to easily obtain a click feel at time of a rotating operating, with avoiding an increase in size and saving a space.

Further features of the present invention will become apparent from the following description of exemplary embodiments (with reference to the attached drawings).

DESCRIPTION OF THE EMBODIMENTS

Examples of image pickup apparatuses equipped with lens barrels according to embodiments of the present invention will be described with reference to the drawings.

First Embodiment

Figure 1:
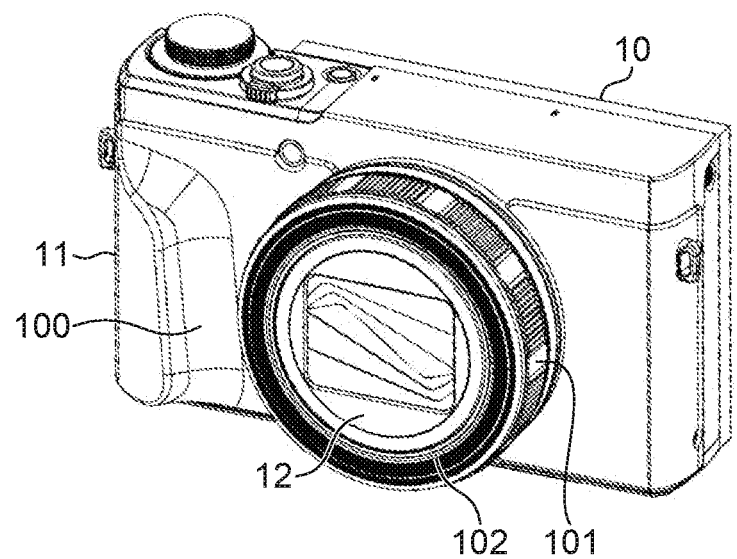
FIG. 1 is a front perspective view showing an appearance of an example of an image pickup apparatus equipped with a lens barrel according to a first embodiment of the present invention.

FIG. 1 is a front perspective view showing an appearance of an example of an image pickup apparatus equipped with a lens barrel according to the first embodiment of the present invention.

The illustrated image pickup apparatus is, for example, a digital camera (hereafter referred to merely the camera) 10, and a lens barrel 12 equipped with a taking lens is integrated with a camera main body. It should be noted that the lens barrel 12 may be removable from the camera main body (main body of the image pickup apparatus), and the lens barrel 12 may be mounted on the camera main body.

The camera 10 has a front cover unit 11 on a front side thereof. The camera 10 is equipped with the lens barrel 12 which forms an optical image on an image pickup device (not shown), and an operating ring 101 provided for the front cover unit 11 is disposed at an outer periphery of the lens barrel 12. The operating ring 101 corresponds to a rotary ring or a rotational member. The camera 10 has the image pickup device that generates an image corresponding to an optical image imaged through the lens barrel 12.

The lens barrel 12 is molded in a cylindrical shape, and on an inner peripheral side of the operating ring 101, a hollow portion is formed all around the outer periphery of the lens barrel 12. The operating ring 101 is held by being sandwiched between a fixation member 102 and a front cover 100.

A photographer can assign an arbitrary function for changing shooting conditions to the operating ring 101. For example, the photographer can change shooting conditions such as a focal position and an exposure value by rotating the operating ring 101.

Figure 2:
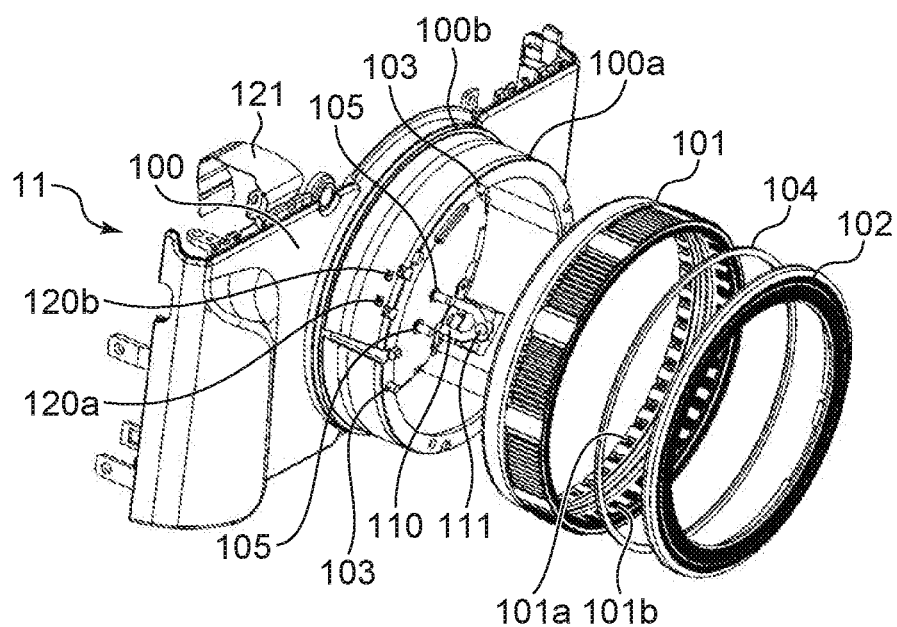
FIG. 2 is an exploded perspective view showing a front cover unit in FIG as well as the lens barrel.

FIG. 2 is an exploded perspective view showing a front cover unit 11 in FIG. 1 as well as the lens barrel 12.

The front cover unit 11 has the front cover 100 in two colors which has its inner side thereof formed of a hard resin such as polycarbonate and its exterior side thereof formed of an elastic resin with high grip. The operating ring 101, which is formed by cutting an aluminum material, has its outer periphery formed in an uneven shape and its outer peripheral surface finished rough by a blasting process. This improves the ease of operation since fingers are less likely to slip when rotating the operating ring 101.

The operating ring 101 is provided for the front cover 100 and is held in a state of being rotatably fitted on an outer peripheral portion of a cylindrical portion (fitting member) 100a corresponding to the outer periphery of the lens barrel 12. The operating ring 101 is rotatably held between the fixing member 102, which is placed at a front end of the frontcover unit 11, and a frontcover fixing portion 100b.

As described above, the operating ring 101 is formed by cutting an aluminum material. As a result, the operating ring 101 resists being deformed when it is held during operation and also has high dimensional accuracy, and therefore, the operating ring 101 is able to slide while being kept in contact with the cylindrical portion 100a. Moreover, even when the operating ring 101 is thinned, it is unlikely to be deformed because its stiffness is maintained.

A part of the cylindrical portion 100a is cut out, and photo-reflectors (detection units) 120a and 120b are disposed in a manner being exposed from a cutout portion. The photo-reflectors 120a and 120b are fixed to a flexible wiring board 121, which will be described later. The flexible wiring board 121 is fixed by a holding sheet metal 122, which will be described later.

A pattern (detected portion) 101b, which has alternating reflective areas and non-reflective areas, is formed in an inner diameter portion of the operating ring 101. The reflection areas reflect light, which is reflected from the photo-reflectors 120a and 120b, at detectable levels, and the non-reflective areas do not reflect light reflected from the photo-reflectors 120a and 120b.

The fixing member 102 is fastened and held at the front end of the cylindrical portion 100a by fixing member fixing screws 103. A sliding sheet 104 is attached to a groove portion (not shown), which extends in a circumferential direction of the fixing member 102, by a double-faced tape (not shown). The sliding sheet 104 is formed of an elastic member to have a cushioning capability.

This prevents the operating ring 101 from rattling in a direction of a rotational axis (thrust direction). A sheet member is used for a surface of the sliding sheet 104, which is in contact with the operating ring 101, so that the sliding sheet 104 can slide easily.

An urging metal sheet (urging member) 110 is fixed to the front cover 100 by metal sheet fixing screws 105. The urging metal sheet 110 is formed of a material which springiness such as stainless steel, phosphor bronze, or titanium copper.

In the front cover 100, an opening 110a, which will be described later, is formed at the front end of the urging metal sheet 110, and a steel ball 111 is engaged with the opening 110a.

The urging metal sheet 110 is disposed in a notched portion 100c formed by cutting out a part of the cylindrical portion 100a. The steel ball 111 is disposed in a through portion and exposes itself from the cylindrical portion 100a. A number of groove portions are formed all around the entire circumference of an inner peripheral portion of the operating ring 101.

The urging metal sheet 110 urges the steel ball 111 against the operating ring 101 in a direction perpendicular to (intersecting) a direction of an optical axis of the lens barrel 12. In the through portion 100d formed in the cylindrical portion 100a, the steel ball 111 abuts on a groove portion 101a formed on the operating ring 101. Namely, the steel ball 111 is urged by the urging metal sheet 110 to abut on the groove portion 101a formed on the operating ring 101.

Thus, when the rotatably-held operating ring 101 is rotated, the steel ball 111 repeatedly climbs over one of the groove portions 101a and abuts on the adjacent one of the groove portions 101a. This implements a click mechanism that generates a click feel.

The urging metal sheet 110 and the steel ball 111 are located outside of the lens barrel 12 and are disposed between the lens barrel 12 and the operating ring 101. The urging metal sheet 110 is urged along the optical axis of the lens barrel 12, namely, toward an outside of the lens barrel 12, that is, urged from an inside of the camera toward an outside of the camera.

Since the grooves are formed in the inner peripheral portion of the operating ring 101, and the steel ball 111 is urged toward the outside by the urging plate metal 110, the grooves constituting the click mechanism are not seen from outside, and hence the appearance is not compromised. Moreover, since the urging metal sheet 110 is placed inside the cutout portion 100c formed in the cylindrical portion 100a, and the groove portions 101a are formed on the operating ring 101, space can be saved without the camera itself being upsized because of the click mechanism.

Figure 3:
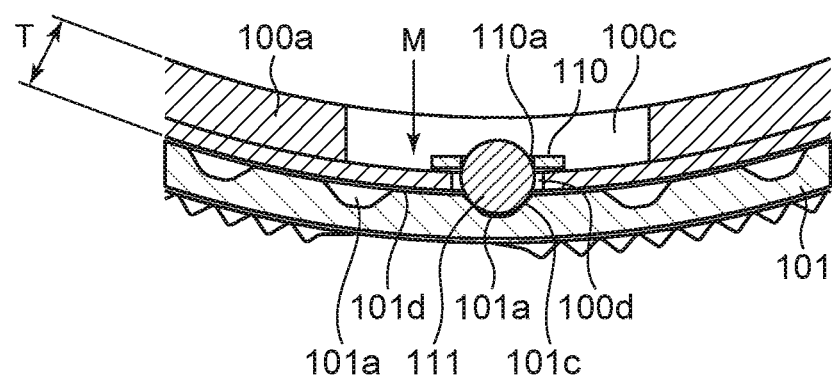
FIG. 3 is a diagram showing a configuration of a click mechanism provided in the front cover unit shown in FIG. 1.

FIG. 3 is a diagram showing a configuration of the click mechanism provided in the front cover unit in FIG. 1.

The click mechanism is configured by the urging metal sheet 110, the steel ball 111, and the groove portions (grooves) 101a. As described earlier, the urging metal sheet 110 is fastened to the front cover 100 by the metal sheet fixing screws 105, and the steel ball 111 is engaged with the urging metal sheet 110.

The urging metal sheet 110 has springiness, and in the vicinity of its front end, the round opening 110a is formed. The steel ball 111 is engaged with the opening 110a and urged in a direction indicated by an arrow M in FIG. 3.

The plurality of groove portions 101a is formed on an inner surface of the operating ring 101, that is, a surface of the operating ring 101 which is close to the cylindrical portion 100a. The groove portions 101a are formed at regular intervals on a 360° inner periphery of the operating ring 101. The urging metal sheet 110 and the steel ball 111 are disposed at a notched portion 100c formed on an inner side of the cylindrical portion 100a which is the lens barrel 12 side.

Thus, the urging metal sheet 110 and the steel ball 111, which are components of the click mechanism, are housed in a portion of the cylindrical portion 100a, which has a thickness t. Also, the groove portions 101a are formed on the inner peripheral surface of the operating ring 101, and therefore, space can be saved without the camera itself being upsized due to the layout of the click mechanism.

A part of the notched portion 100c formed in the cylindrical portion 100a is configured as the through portion 100d, and the steel ball 111 is exposed to the operating ring 101 side through the through portion 100d. Each of the groove portions 101a has a side face thereof inclined to form a side face inclined portion 101c, and in a stationary state, the steel ball 111 is caused to abut on the groove portion 101a by an urging force of the urging metal sheet 110. Thus, the steel ball 111 abuts on the side face inclined portion 101c.

When the operating ring 101 is rotated, the steel ball 111 moves out of the groove portion 101a along the side face inclined portion 101c, and abuts on a sliding portion 101d, which is located between one groove portion 101a and the adjacent groove portion 101a. When the operating ring 101 is further rotated, the steel ball 111 fits into this adjacent groove portion 101a, causing the photographer to feel a click. Namely, the steel ball 111 repeatedly switches between an abutting state in which the steel ball 111 abuts on the groove portions and a non-abutting state in which the steel ball 111 does not abut on the groove portions when the operating ring 101 is rotated.

Although according to the above description, the groove portions 101a and the steel ball 111 constituting the click mechanism abut on each other, the embodiment is not limited to this example. For example, a resin pin with an R-shaped portion abutting on the groove portions 101a may be used in place of the steel ball 111. Alternatively, the urging metal sheet 110 may have an R-shaped portion, which abuts on the groove portions 101a.

As described above, the groove portions 101a are formed at regular intervals in the inner peripheral portion of the operating ring 101, and the urging metal sheet 110 and the steel ball 111 are provided in the front cover 100 to constitute the click mechanism. This eliminates the need to generate the click mechanism all around the entire circumference of the vicinity of the lens barrel 12 and thus saves space without upsizing the camera itself.

Figure 4A:
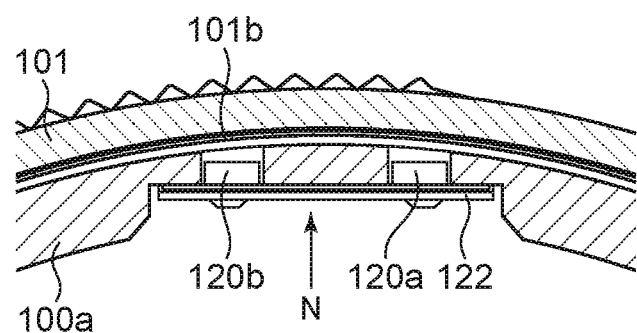
FIG. 4A is a cross-sectional view schematically showing a photo-reflector.
Figure 4B:
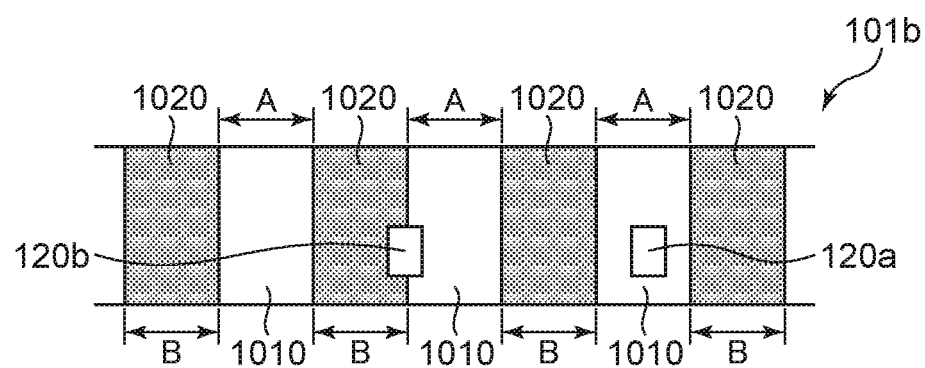
FIG. 4B is a schematic diagram showing an arrangement of the photo-reflector and a pattern.

FIGS. 4A and 4B are diagrams useful in explaining the placement of the photo-reflectors in FIG. 2. FIG. 4A is a cross-sectional view schematically showing the photo-reflectors, and FIG. 4B is a schematic diagram showing the placement of the photo-reflectors and the pattern.

As shown in FIG. 4A, the photo-reflectors 120a and 120b are mounted on the flexible wiring board 121. The photo-reflectors 120a and 120b are disposed on the inner peripheral side of the operating ring 101 and is directed from a center axis of the operation ring 101 toward the outside. The flexible wiring board 121 is held by the holding plate metal 122.

The holding metal sheet 122 is fixed to the front cover 100 by screws (not shown). As described earlier, the pattern 101b with the alternating the reflective areas and the non-reflective areas is formed on the inner peripheral surface of the operating ring 101. The pattern 101b is located in opposed relation to the photo-reflectors 120a and 120b.

As shown in FIG. 4B, the pattern 101b has reflective areas 1010, which are glossed by cutting an aluminum material, and the non-reflective areas 1020, which are coated to have not gloss. The reflective areas 1010 and the non-reflective areas 1020 are arranged regularly with equal widths.

Thus, with rotation of the operating ring 101, the light-receiving units of the photo-reflectors 120a and 120b are alternately brought into a light-receiving state and a non light-receiving state, and detection signals output from the light-receiving units are sent to a signal processing circuit (not shown).

Referring to FIG. 4B, the photo-reflectors 120a and 120b are placed such that when the photo-reflector 120a lies at substantially the center of the reflective area 1010, the photo-reflector 120b substantially lies on the border between the reflective area 1010 and the non-reflective area 1020. This layout maximizes a phase difference between detection signals output from the photo-reflectors 120a and 120b.

To detect a rotation direction, it is necessary to obtain a phase difference between two detection signals. Because of the phase difference, whether or not the photo-reflector 120b receives light when the photo-reflector 120a receives light differs according to a rotation direction of the operating ring 101. Based on this difference, the signal processing circuit is able to determine a direction in which the operating ring 101 is rotating.

Figure 5:
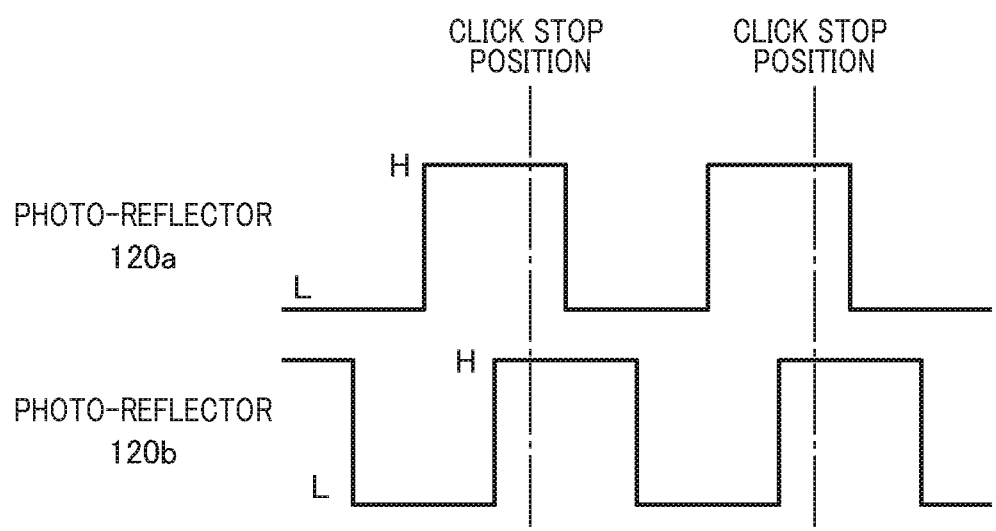
FIG. 5 is a diagram showing an example of a waveform of a detection signal output from the photo-reflector when the operation ring shown in FIG. 2 is operated to rotate.

FIG. 5 is a view showing examples of detection signal waveforms output from the photo-reflectors when the operating ring in FIG. 2 is rotated.

FIG. 5 shows detection signal waveforms output from the photo-reflectors 120a and 120b when the operating ring 101 is rotated. Here, a range where the detection signal is at a high level (H) represents a light-receiving state, and a range where the detection signal is at a low level (L) represents a nonlight-receiving state. Here, the detection signal waveforms output from the photo-reflectors 120a and 120b have a phase difference of substantially a half phase.

In the example in FIG. 5, when the operating ring 101 has been rotated, and the photo-reflector 120b has received light, this means that the operating ring 101 has been rotated clockwise unless the photo-reflector 120a has received light. On the other hand, when the photo-reflector 120a has not received light when the photo-reflector 120b has received light, this means that the operating ring 101 has been rotated counterclockwise when the photo-reflector 120a has received light.

When there is no phase difference between the detection signal waveforms from the photo-reflectors 120a and 120b, the detection signal waveforms from the photo-reflectors 120a and 120b remain the same irrespective of the direction in which the operation ring 101 is rotated. As a result, a rotation direction of the operating ring 101 cannot be detected.

When there is only a little difference between the detection signal waveforms from the photo-reflectors 120a and 120b, the phase difference varies, causing misdetection of a rotation direction of the operating ring 101. Also, when the distance between the photo-reflectors 120a and 120b and the pattern 101b is not constant and not stable, the detection signal waveforms may vary, causing the misdetection as well.

When the detection signal waveform from the photo-reflector 120b changes from L to H, the signal processing circuit determines that the operating ring 101 has rotated one pitch when detecting its rotational amount. As described earlier, the alternating reflective areas 1010 and the non-reflective a 1020 are formed at regular intervals of the same pitch all around the entire circumference of the inner peripheral surface of the operating ring 101. That is, every time the operation ring 101 is rotated one-pitch, it is possible to detect the rotation of the operation ring 101.

An arrangement relationship between the photo-reflectors 120a and 120b, and the pattern 101b, at a click position at which the steel ball 111 abuts on the groove portion 101a, is as shown in FIG. 5. Namely, when the operating ring 101 is not rotating in the click position where the steel ball 111 abuts on the groove portion 101*a*, the photo-reflectors 120*a* and 120*b*, and the pattern 101*b* have such a positional relationship that the detection signal waveforms are in the H range.

The click positions are provided by the number of groove portions 101*a* which are equally arranged 360° in the operation ring 101. Thus, the photo-reflectors 120*a* and 120*b* and the pattern 101*b* are placed such that whenever the operating ring 101 comes to a click position, the positional relationship between the photo-reflectors 120*a* and 120*b* and the pattern 101*b* changes from the one in FIG. 4B to a click stop position in FIG. 5.

The photo-reflectors 120*a* and 120*b* are disposed with respect to the pattern 101*b* such that their detecting direction is a direction indicated by an arrow N in FIG. 4A, and they are fixed vertically to the flexible wiring board 121.

Figure 6:
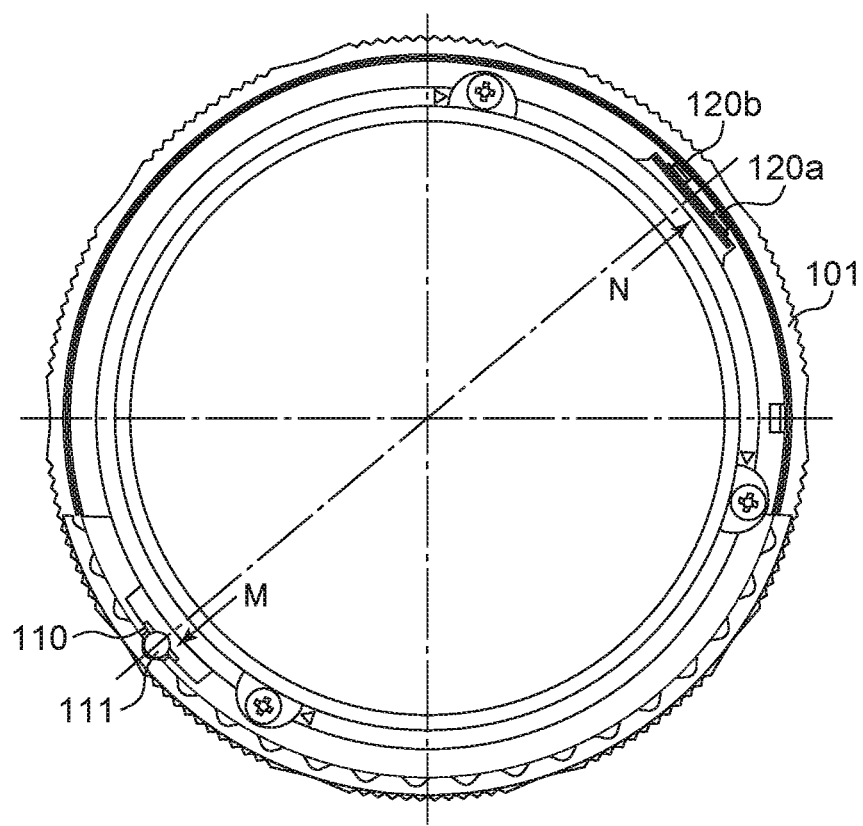
FIG. 6 is a diagram showing an arrangement relationship between the photo-reflector shown in FIG. 4 and the click mechanism.

FIG. 6 is a diagram useful in explaining the positional relationship between the photo-reflectors and the click mechanism in FIGS. 4A and 4B.

The photo-reflectors 120*a* and 120*b* and the click mechanism including the steel ball 111 are placed substantially symmetric with respect to the rotational axis of the operating ring 101. An urging direction M in which the urging metal sheet 110 urges the steel ball 111 against the groove portion 101*a* is substantially parallel to a direction N that is the detection direction of the photo-reflectors 120*a* and 120*b*.

As described earlier, the urging metal sheet 110 has springiness. The urging metal sheet 110 urges the operating ring 101, which has the groove portions 101*a* in the urging direction M via the steel ball 111. The operating ring 101 fits on the cylindrical portion 100*a* provided in the front cover 100. Here, the cylindrical portion 100*a* is a component formed of resin molded article, and the operating ring 101 is a component cut from an aluminum material.

The cylindrical portion 100*a* and the operating ring 101 slide in contact with each other, and hence a sliding resistance increases due to a difference in thermal contraction caused by temperature change. Thus, a clearance is provided between the cylindrical portion 100*a* and the operating ring 101 in order to prevent the operability of the operating ring 101 from becoming worse.

Figure 7:
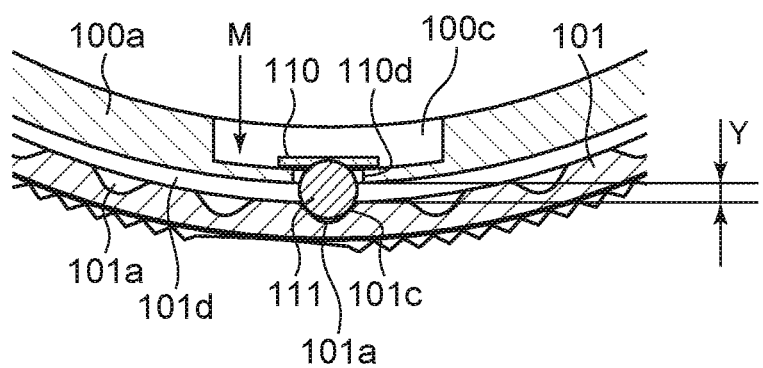
FIG. 7 is a diagram showing an example of a shift of the operation ring shown in FIG. 6.

FIG. 7 is a diagram showing an example of a state in which the operating ring in FIG. 6 leans to one side.

A number of components that hold and fix the cylindrical portion 100*a* and the operating ring 101 are placed around them, and hence there are tolerances and clearances of the components. Thus, as shown in FIG. 7, there is a gap Y between the operating ring 101 and the cylindrical portion 100*a*, which fits on and holds the operating ring 101. This gap Y is formed all around the entire inner circumference of the operating ring 101. On the other hand, since the urging meal sheet 110 urges the operating ring 101 in the urging direction M via the steel ball 111, the operating ring 101 leans toward the click mechanism side without a rattle corresponding to the gap Y occurring in the operating ring 101 all around its entire circumference.

As described earlier, the photo-reflectors 120*a* and 120*b* and the click mechanism including the steel ball 111 are placed substantially symmetric with respect to the rotational axis of the operating ring 101. The detecting direction N of the photo-reflectors 120*a* and 120*b* in FIG. 4A and the urging direction M of the urging metal sheet 110 in FIG. 3 are substantially parallel to each other.

Therefore, even though a gap is generated between the cylindrical portion 100*a* and the operating ring 101, the operating ring 101 leans to one side toward the click mechanism which has the urging metal sheet 110 by urging force of the urging metal sheet 110. For this reason, the distance between the operating ring 101, which is located on the photo-reflectors 120*a* and 120*b* side, and the cylindrical portion 100*a* is maintained constant without a gap being formed between them. Namely, the distance between the photo-reflectors 120*a* and 120*b* fixed to the front cover 100 and the pattern 101*b* formed in the operating ring 101 is maintained constant.

Thus, stable detection using the photo-reflectors 120*a* and 120*b* is possible even when the clearance is provided between the operating ring 101 and the cylindrical portion 100*a*, and gaps vary with components due to variations in molding.

Thus, according to the first embodiment of the present invention, placing the operating ring on the outer periphery of the lens barrel enables not only stable detection of the rotation of the operating ring but also downsizing of the lens barrel.

Second Embodiment

A description will be now given of a camera according to a second embodiment of the present invention. The camera according to the second embodiment and the camera according to the first embodiment differ in their operating rings and structures that urge them, but otherwise they are identical.

Figure 8A:
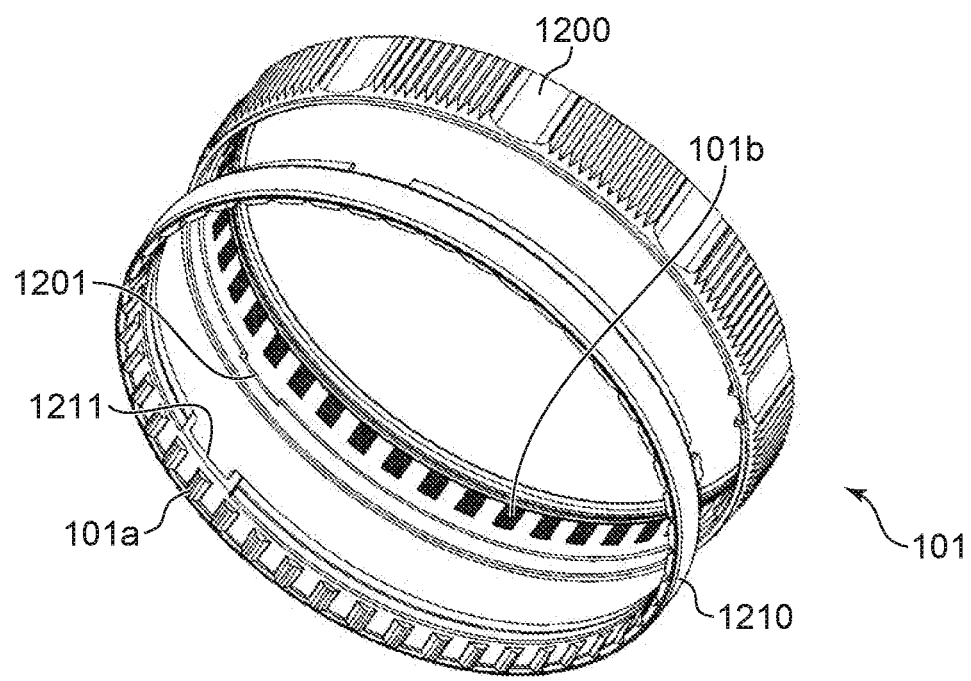
FIG. 8A is a perspective view showing an example of an operation ring used in a camera equipped with a lens barrel according to a second embodiment of the present invention.
Figure 8B:
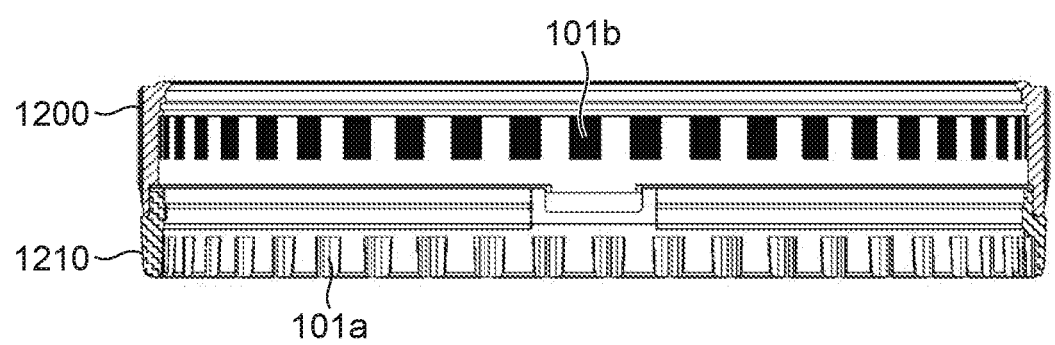
FIG. 8B is a cross-sectional view.

FIGS. 8A and 8B are views useful in explaining an example of the operating ring for use in the camera equipped with a lens barrel according to the second embodiment of the present invention. FIG. 8A is a perspective view, and FIG. 8B is a cross-sectional view.

An illustrated operating ring 101 has a ring-like gripping portion (gripping member) 1200 and a ring-like groove forming portion (groove forming member) 1210. The gripping portion 1200 is gripped by the photographer when rotating. The above described groove portion 101*a* is formed in the groove forming portion 1210 to which the gripping portion 1200 is attached.

The gripping portion 1200, which is formed by cutting an aluminum material, has its outer periphery formed in an uneven shape and its outer peripheral surface finished rough by a blasting process. The inner peripheral surface (inner peripheral portion) of the gripping portion 1200 is processed by lathing, and the above-described pattern 101*b* is formed at the inner peripheral portion.

The groove forming portion 1210 is a component formed of hard resin (resin material) such as polycarbonate. The groove portions 101*a* are formed at regular intervals around the 360° of the inner peripheral surface (inner peripheral portion). As described earlier, the side face of the groove portion 101*a* is inclined.

An engaged protruding portion 1201 is formed at the gripping portion 1200, and an engaged recess portion 1211 is formed at the groove forming portion 1210. The gripping portion 1200 and the groove forming portion 1210 are engaged with each other at a predetermined phase by the engaged protruding portion 1201 and the engaged recess portion 1211 and are fixed by an adhesive.

As illustrated in FIG. 8B, the groove portions 101*a* are located on an outside of the gripping portion 1200 in a rotational axis direction of the operating ring 101, and the groove forming portion 1210 is located on the photographer side in the image pickup apparatus 10. Further, the gripping portion 1200 and the groove forming portion 1210 are assembled by the engaged protruding portion 1201 and the engaged recess portion 1211 such that the pattern 101b and the groove portions 101a have a predetermined phase.

Thus, the steel ball 111 in FIG. 3 is defined to have the click position where the steel ball 111 abuts on the groove portion 101a and the click stop position in FIG. 5.

In the first embodiment described earlier, the operating ring 101 is formed by cutting an aluminum material, and the groove portions 101a are formed by cutting. At this time, it is necessary to form the groove portions 101a at regular intervals of the same pitch all around the entire circumference of the inner peripheral surface of the operating ring 101. Namely, since the number of the groove portions 101a, which correspond to the number of clicks when the operating ring 101 is rotated, is required, thus, a number of groove portions are to be formed by cutting. This increases the cost of the operating ring 101 itself due to the long cutting time when forming the groove portions 101a.

In the second embodiment, the groove portions 101a may be formed when the groove forming portion 1210 itself is formed of resin, so that this process does not take long. As a result, it enables to make the operating ring inexpensive.

As described above, by forming the operating ring 101 dividing into the gripping portion 1200 requiring rigidity and the groove forming portion 1210 at which the groove portions 101a are formed, to assemble them as described earlier, it enables to reduce the cost while improving the quality.

Thus, according to the second embodiment of the present invention, placing the operating on the outer periphery of the lens barrel enables not only stable detection of the rotation of the operating ring but also downsizing of the lens barrel.

Third Embodiment

A description will be now given of a camera according to a third embodiment of the present invention. The camera according to the third embodiment and the camera according to the first and second embodiments differ in their operating rings and structures that urge them, but otherwise they are identical.

Figure 9A:
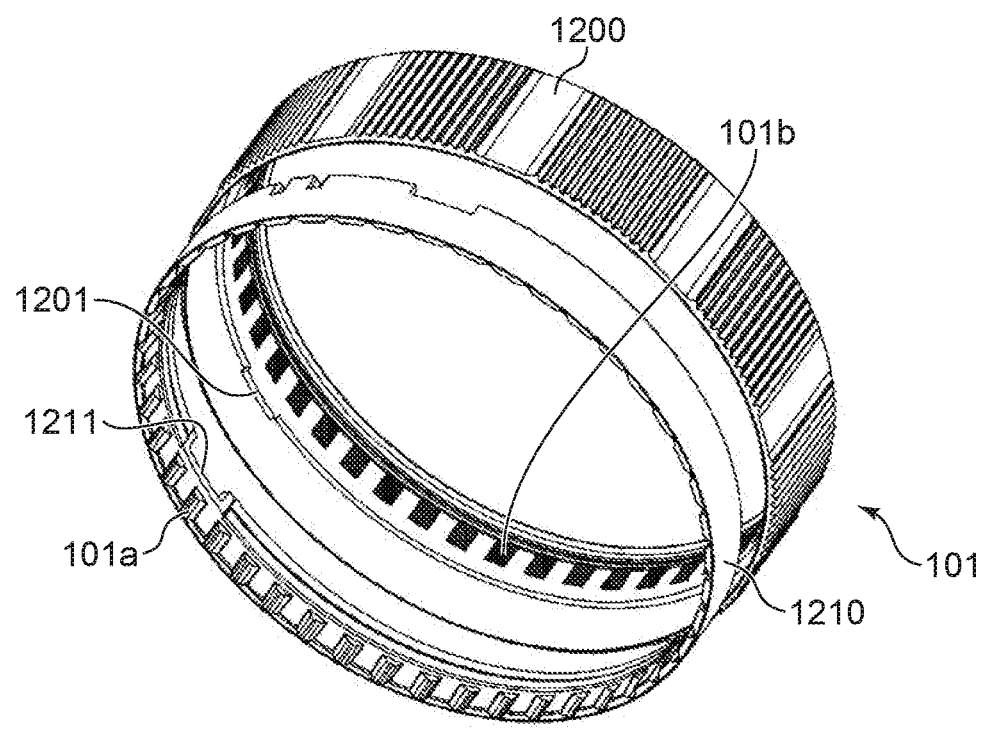
FIG. 9A is a perspective view showing an example of an operating ring used in a camera equipped with a lens barrel according to a third embodiment of the present invention.
Figure 9B:
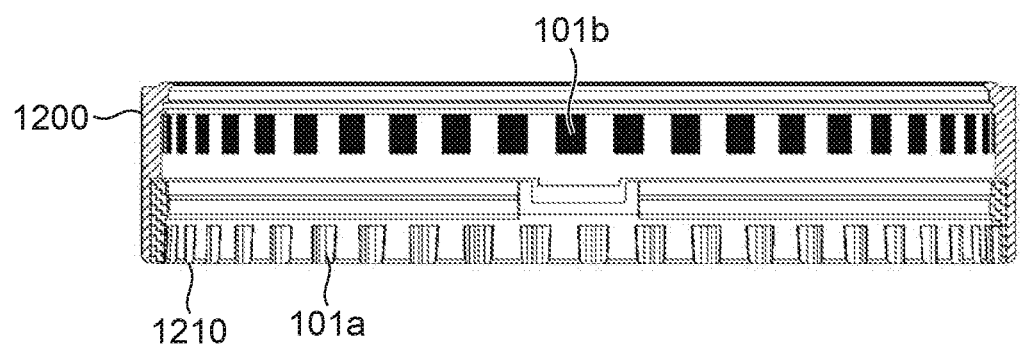
FIG. 9B is a cross-sectional view.

FIGS. 9A and 9B are diagrams useful in explaining an example of the operating ring used in the camera equipped with a lens barrel according to the third embodiment of the present invention. FIG. 9A is a perspective view, and FIG. 9B is a cross-sectional view.

In the example in FIG. 9A, a groove forming portion 1210 is formed on the inner peripheral surface of a gripping portion 1200. In the second embodiment described earlier, the gripping portion 1200 and the groove forming portion 1210 are placed to overlap each other in a direction of a rotational axis, thus, a part of the outer peripheral surface of the groove forming portion 1210 constitutes the appearance. Therefore, in order to improve the appearance grade of a lens barrel, performing surface processing such as coating and embossing are needed.

In the third embodiment, the groove forming portion 1210 is housed in the inner peripheral portion of the gripping portion 1200. Namely, because the groove forming portion 1210 is totally covered by the gripping portion 1200, the appearance grade is not needed for the groove forming portion 1210.

According to the description above, because it reduces the cost of the groove forming portion 1210 while maintaining the appearance grade of the operation ring 101, it enables to reduce the total cost while further improving the quality.

Thus, according to the third embodiment of the present invention, placing the operating ring on the outer periphery of the lens barrel enables not only stable detection of the rotation of the operating ring but also downsizing of the lens barrel.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-177490, filed Sep. 21, 2018, which is hereby incorporated by reference herein in its entirety.

What is claimed is:

1. An image pickup apparatus comprising:
   a rotary ring located at least in part on an outer periphery of a lens barrel so as to determine an operation performed on the rotary ring according to rotation of the rotary ring, the rotary ring including a plurality of grooves formed in an inner periphery of the rotary ring and arrayed in a circumferential direction of the rotary ring;
   a fitting member with which the rotary ring is fit, the fitting member being cylindrical and located on the outer periphery of the lens barrel; and
   a click member disposed between the outer periphery of the lens barrel and the inner periphery of the rotary ring to generate a click feel and urge the rotary ring in a direction intersecting a rotational axis of the rotary ring,
   wherein the click member comprises an urging plate with springiness, and a ball urged by the urging plate in a direction from an inside of the rotary ring toward an outside of the rotary ring while being engaged with an opening formed in the urging plate, to generate a click feel by repeating an abutting state in which the ball abuts on one of the plurality of grooves and a non-abutting state in which the ball does not abut on the plurality of grooves along with rotation of the rotary ring, and
   wherein the urging plate is located inside a cutout obtained by cutting out an inner periphery of the fitting member, and the ball protrudes from a through portion of the cutout so as to abut on one of the plurality of grooves.

2. The image pickup apparatus according to claim 1, further comprising:
   a photo-reflector that detects a rotation direction and a rotational amount of the rotary ring when the rotary ring is rotated; and
   a detected portion formed on the inner periphery of the rotary ring, to be detected by the photo-reflector,
   wherein the photo-reflector and the click member are placed symmetric with respect to the rotational axis, and a detecting direction of the photo-reflector and an urging direction of the urging plate are parallel to each other.

* * * * *